(12) United States Patent
Zivkovic et al.

(10) Patent No.: US 11,376,893 B2
(45) Date of Patent: Jul. 5, 2022

(54) TIRE OF WHICH THE TREAD COMPRISES WAVY GROOVES

(71) Applicant: COMPAGNIE GENERALE DES ETABLISSEMENTS MICHELIN, Clermont-Ferrand (FR)

(72) Inventors: Tony Zivkovic, Clermont-Ferrand (FR); Philippe Gervais, Clermont-Ferrand (FR); Guillaume Bacher, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 198 days.

(21) Appl. No.: 16/628,494

(22) PCT Filed: Jul. 4, 2018

(86) PCT No.: PCT/FR2018/051671
§ 371 (c)(1),
(2) Date: Jan. 3, 2020

(87) PCT Pub. No.: WO2019/008276
PCT Pub. Date: Jan. 10, 2019

(65) Prior Publication Data
US 2020/0139766 A1 May 7, 2020

(30) Foreign Application Priority Data

Jul. 5, 2017 (FR) ........................................ 1756333

(51) Int. Cl.
*B60C 11/12* (2006.01)
*B60C 11/03* (2006.01)

(52) U.S. Cl.
CPC ...... *B60C 11/1281* (2013.01); *B60C 11/0323* (2013.01); *B60C 11/125* (2013.01); *B60C 2011/1209* (2013.01)

(58) Field of Classification Search
CPC ............... B60C 11/1281; B60C 11/125; B60C 11/0323; B60C 2011/1209; B60C 2011/1254
See application file for complete search history.

(56) References Cited

U.S. PATENT DOCUMENTS 5,180,453 A * 1/1993 Fukasawa ........... B60C 11/0311
152/209.13
5,385,189 A * 1/1995 Aoki ....................... B60C 11/04
152/209.21

(Continued)

FOREIGN PATENT DOCUMENTS

WO WO 2011/039194 4/2011
WO WO 2016/188956 12/2016

*Primary Examiner* — Katelyn W Smith
*Assistant Examiner* — Brendon Charles Darby
(74) *Attorney, Agent, or Firm* — Cozen O'Connor

(57) ABSTRACT

A tire tread having a tread surface (20) in the new state and at least one wavy groove (1) opening into the tread surface, the groove is the new state having external cavities (11) that open onto the tread surface in the new state along a length (Le) and internal cavities (12) that do not open onto the tread surface. The external cavities (11) have a bottom (110) of which the points that are innermost in the tread are at a distance (H1) from the tread surface (20) in the new state, the internal cavities (12) having a bottom (120) of which the innermost points are at a distance (H22) from the same tread surface (20). The external cavities (11) and the internal cavities (12) being connected together by linking cavities (13). The tread (2) being such that at least two sipes (31, 32)

(Continued)

are formed from the bottom (110) of the external cavities (11) and along an entire length (Le) of these external cavities (11).

10 Claims, 1 Drawing Sheet

(56) References Cited

U.S. PATENT DOCUMENTS

| | | | |
|---|---|---|---|
| 2003/0201048 A1* | 10/2003 | Radulescu | B29D 30/0606 152/209.25 |
| 2012/0227883 A1* | 9/2012 | Audigier | B60C 11/0323 152/209.18 |
| 2014/0290814 A1 | 10/2014 | Audigier | |

* cited by examiner

TIRE OF WHICH THE TREAD COMPRISES WAVY GROOVES

RELATED APPLICATIONS

This is a U.S. National Phase Application under 35 USC 371 of International Application PCT/FR2018/051671 filed on Jul. 4, 2018.

This application claims the priority of French application no. 1756333 filed Jul. 5, 2017, the entire content of which is hereby incorporated by reference.

FIELD OF THE INVENTION

The invention relates to treads for tires and more particularly to the tread pattern designs of these treads, and to the tires provided with such treads which have a more lasting ability to drain away water on the road surface in times of wet weather, these treads also having improved wearing performance.

BACKGROUND OF THE INVENTION

As is known, the use of tires in wet weather running conditions requires rapid elimination of the water present in the contact patch in which the tire makes contact with the road surface in order to ensure that the material making up the tread comes into contact with this road surface. The water which is not pushed ahead of the tire flows or is collected partially in the cuts or voids formed in the tread of the tire.

These cuts or voids form a flow network which needs to be lasting, that is to say effective throughout the duration of use of a tire between its new state and its removal on account of wear reaching a limit set by regulations.

For tires intended for the steering or load-bearing axles of a heavy-duty vehicle, it is common practice to form, in the tread of these tires, circumferential grooves (or longitudinal grooves), the depth of which is equal to the total thickness of the tread (this total thickness not taking into consideration the thickness that may be intended for allowing partial renewal of the grooves through an operation referred to as regrooving). Thus, it is possible to obtain a tread that has a water drainage performance which is always above a minimum performance referred to as the safe performance, this being true regardless of the level of wear of this tread.

For prior art tires, the total voids volume in the new state is, as a general rule, at least equal to 10% and at most equal to 25% of the total volume of the tread intended to be worn away during running (the total volume corresponding to the volume of material to which said total voids volume is added). It is found that these tires have an available voids volume in the contact patch which is relatively high in the new state (available voids volume meaning that this volume is potentially able to be partially or completely filled with the water present on the road surface). The voids volume opening onto the tread surface in the contact patch is evaluated when the tire is subjected to its standard inflation and load conditions as defined notably by the E.T.R.T.O. standard for Europe.

While cuts or, more generally, cavities are essential to draining away water in the contact patch in contact with the road surface, the resulting reduction in the volume of material on the tread may appreciably affect the wearing performance of this tread and consequently may reduce the service life of the tire that results from an increase in the rate of wear of said tread.

Among the cuts, a distinction is made between grooves and sipes, the latter differing from the grooves by having a width suited to allowing the opposing walls that delimit them to come at least partially into contact with one another when in the contact patch. The grooves bring about a reduction in the compression and shear stiffnesses because these grooves delimit portions of material that are sensitive to deformation compared with the portions delimited by sipes, the walls of which come into contact with one another when in the contact patch. This reduction in stiffness, when grooves are present, causes an increase in deformation and brings about a reduction in the wearing performance of the tread. Greater wear for a set distance covered is observed and this corresponds to an increase in the rate of wear of the tread. Furthermore, an increase in rolling resistance and therefore in fuel consumption of vehicles equipped with such tires is observed as a result of an increase in the hysteresis losses associated with the cycles of deformation of the material of which the tread is made.

In order to limit the reduction in stiffness associated with the presence of grooves that is required as a result of the need to ensure the drainage of water, a solution described in the patent publication WO 2011/039194 has been proposed. That solution proposes forming a tread for a tire intended for a heavy-duty vehicle, this tread having a thickness E and being provided with a plurality of wavy grooves in the thickness of the tread, this wavy groove opening discontinuously onto the tread surface in the new state. Each wavy groove has external cavities that are open at the surface, these external cavities being separated from one another in the main direction of the wavy groove. The main direction of the wavy groove corresponds to the direction of the flow of fluid in the groove. In addition to the external cavities, this wavy groove comprises a plurality of internal cavities formed inside the tread, these internal cavities being positioned radially and entirely on the inside with respect to the tread surface in the new state between the external cavities. The internal cavities may be designed to lie at different depth levels in the thickness of the tread.

Moreover, the continuity of the flow of water in each wavy groove when the tire is in the new state is ensured by the presence of linking cavities or intermediate cavities, each linking cavity connecting an external cavity to an internal cavity. Each linking cavity has two ends, one of these ends being connected to an internal cavity on one side and the other end being connected to an external cavity on the other side.

By virtue of the presence of these linking cavities, it is possible, when running on a road surface covered in water, to ensure circulation of the water from an external cavity to an internal cavity and thus to obtain better drainage of the water and better thermal ventilation of the tread.

In addition, by virtue of this tread structure, a voids volume that is appropriate and reduced compared with that in the case of grooves that open entirely onto the tread surface is obtained. This type of wavy groove makes it possible to limit the reduction in stiffness of the tread in the new state.

It has been found that the presence of a wavy groove could generate irregular wear, that is to say localized wear in certain parts, in contrast to regular wear, which uniformly affects the entire tread surface of a tread. This irregular wear may cause the tire to be withdrawn from service early for retreading.

DEFINITIONS

Each external cavity comprises opposing walls, these walls being connected together by a bottom. The distance between the opposing walls defines a maximum width of the external cavity. The distance between the points of the bottom that are innermost in the tread and the tread surface in the new state defines a depth of the external cavity. Each external cavity has a mean length measured at its bottom in the main direction of the wavy groove.

The maximum depth of the internal cavities corresponds to the depth of the bottom of the innermost internal cavities measured with respect to the tread surface in the new state.

A cut generically denotes either a groove or a sipe and corresponds to the space delimited by walls of material that face one another and are at a non-zero distance (referred to as the "width of the cut") from one another. It is precisely this distance that distinguishes a sipe from a groove; in the case of a sipe, this distance is appropriate for allowing the opposing walls that delimit said sipe to come into at least partial contact at least when in the contact patch in contact with the road surface. In the case of a groove, the walls of this groove cannot come into contact with one another under the usual running conditions as defined for example by the E.T.R.T.O.

The main direction of a groove corresponds to the direction of a flow of water in the groove when running on a road surface covered with water.

The tread surface of a tread corresponds to all of the elementary surfaces of the tread that can come into contact with a road surface when a tire provided with such a tread is running.

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

The total thickness E of a tread is measured, on the equatorial plane of the tire provided with this tread, between the tread surface and the radially outermost part of the crown reinforcement in the new state.

A tread has a maximum thickness of material that can be worn away during running, this maximum wearable thickness of material being less than the total thickness E.

The usual running conditions of the tire or use conditions are those which are defined by the E.T.R.T.O. standard for running in Europe; these use conditions specify the reference inflation pressure corresponding to the load-bearing capacity of the tire as indicated by its load index and speed rating. These use conditions can also be referred to as "nominal conditions" or "working conditions".

SUMMARY OF THE INVENTION

To solve this problem, an embodiment of the invention proposes a tread for a tire of a heavy-duty vehicle, this tread comprising a tread surface that is intended to come into contact with a road surface during running and, opening onto this tread surface, at least one wavy groove, that is to say a groove that opens discontinuously onto the tread surface in the new state, each wavy groove having external cavities that open onto the tread surface in the new state along a length Le and internal cavities that do not open onto the tread surface in the new state, the external cavities comprising a bottom of which the points that are innermost in the tread are at a distance H1 from the tread surface in the new state, the internal cavities having a bottom of which the innermost points are at a distance H22 from the same tread surface, these external cavities and these internal cavities being connected together by linking cavities, this tread being characterized in that at least two sipes are formed from the bottom of the external cavities and along the entire length Le of these external cavities, these sipes having depths (measured from the bottom of the external cavities) at least equal to 50% (and preferably to at least 75%) of the difference between the maximum depth of the bottom of the internal cavities and the depth of the external cavities (the latter depth being measured between the tread surface in the new state and the bottom of the external cavity).

By virtue of this advantageous disposition, it is possible to regulate the stiffnesses of the material elements of the tread in the vicinity of the external cavities and in the vicinity of the internal cavities following enough partial wear to reveal the new grooves formed by the internal cavities at the tread surface.

According to another variant of the invention, two sipes are formed in the bottom of the external cavities, said sipes being spaced apart in the bottom by a distance equal to the maximum width of the external cavity.

Preferably, the sipes formed in the bottom of the external cavities have a depth at least equal to the difference between the maximum depth of the internal cavities and the depth of the external cavities.

An advantageous variant consists in inclining the sipes formed in the bottom of each external cavity with respect to one another. These sipes are inclined such that the distance between these sipes increases with depth.

Advantageously, and for all the variants of the invention, each sipe may end in an end cavity of appropriate shape, the maximum width of this end cavity being greater than the mean width of the sipe. It is in particular possible to create an end cavity that is continued laterally on only one side with respect to the sipe. Advantageously, this cavity is not positioned radially under the bottom of the external cavity. This end cavity may be geometrically appropriate to create perceptible and favourable flexibility following enough partial wear.

Advantageously, the sipes formed in the bottom of the external cavities are also formed in the bottom of the linking cavities that form the link between external cavities and internal cavities in order that there is continuity between the bottom of these sipes and the bottom of the internal cavities. The bottom of the linking cavities is continuous with the bottom of the internal cavities and that of the external cavities.

As an alternative embodiment of the invention, it is possible to realize configurations that are not necessarily symmetric: for example, the sipes formed from the bottom of the external cavities may have different inclinations, the widened portions formed at the ends of these sipes may also be different on each side.

In advantageous variants, the sipes may have a geometry comprising mechanical interlocking means (for example by being wavy or zigzag-shaped in the depth with suitable amplitudes).

Further features and advantages of the invention will become apparent from the following description provided with reference to the appended drawings which show, by way of non-limiting examples, embodiments of the subject matter of the invention.

DETAILED DESCRIPTION OF THE FIGURES

To make the figures easier to understand, identical reference signs have been used to describe variants of the invention where these reference signs refer to elements of the same kind, whether structurally or functionally.

Figure 1:
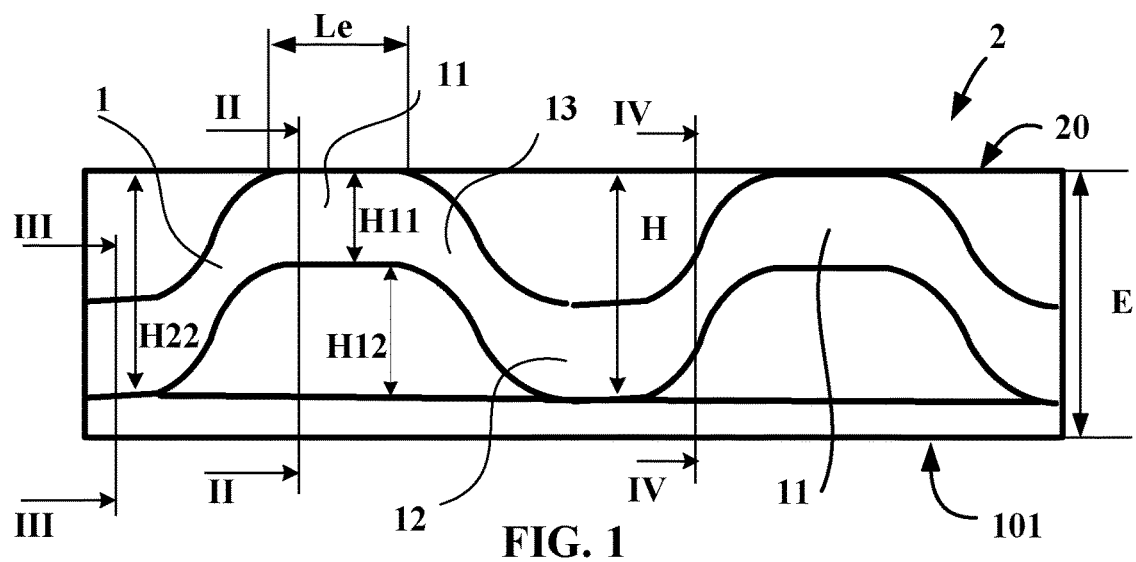
FIG. 1 shows a view in cross section of a first variant of a wavy groove formed in a tread according to the invention.

FIG. 1 shows a view in cross section, in a plane perpendicular to the axis of rotation of a tire, of a part of a wavy groove 1 moulded in a tread 2, this wavy groove 1 extending in the circumferential direction. The tread 2 has a thickness E of material to be worn away.

This wavy groove 1 comprises a plurality of external cavities 11 and a plurality of internal cavities 12, these external and internal cavities being disposed alternately in the main direction of the wavy groove, that is to say in the direction of fluid flow within the wavy groove (this direction corresponds to the circumferential direction in the present case).

Each external cavity 11 opens in the new state onto the tread surface 20 of the tread 2, this tread surface 20 corresponding to the surface of the tread that is intended to come into contact with the road surface when running Each external cavity 11 comprises opposing walls 111, 112 that are spaced apart by an appropriate distance L1 for there not to be contact between these walls when in the contact patch. These opposing walls 111, 112 are connected together by a cavity bottom 110, the points of this cavity bottom that are innermost in the internal cavity 11 being situated at a distance H1 from the tread surface 20 in the new state.

Each internal cavity 12 is in the form of a channel moulded entirely under the tread surface 20 in the new state and is intended to open onto the tread surface after the tread has been partially worn away. Each internal cavity 12 starts at a depth H21 and extends down to a depth H22, the latter depth being at most equal to the thickness E of tread material to be worn away. Each internal cavity 112 has a maximum width L2 measured between its lateral walls 121, 122; in the present case, this width L2 is equal to the width L1 of the external cavities 11. The bottom 120 of each internal cavity 112 is at a depth H22 with respect to the tread surface 20 in the new state.

Linking cavities 13 are formed between the external cavities 11 and the internal cavities 12 so as to ensure continuity of fluid flow in the wavy groove 1 in the new state, specifically up to partial wear corresponding more or less to the disappearance of the external cavities.

Moreover, in the bottom 110 of each external cavity 11, two sipes 31, 32 are formed in the continuation of the respective opposing walls 111, 112 delimiting this external cavity 11. These sipes 31, 32 have an appropriate width to allow the walls of material delimiting them to come into contact when in the contact patch. These sipes 31, 32 have a depth H3 such that their innermost points are at a depth, with respect to the tread surface 20 in the new state, equal to the maximum depth of the internal cavities 12.

In this variant, the sipes 31, 32 are provided at their ends that are innermost in the tread with widened portions 310, 320 of circular section and small volume.

By virtue of this disposition, it is possible to regulate the stiffness of the tread in the vicinity of the internal cavities 12 when the external cavities 11 are in the course of disappearing following partial wear and when they have disappeared from the tread. This is particularly favourable for reducing the risk of irregular wear, this consequently making it possible to avoid early withdrawal of the tire from service.

Figures 2, 3, 4:
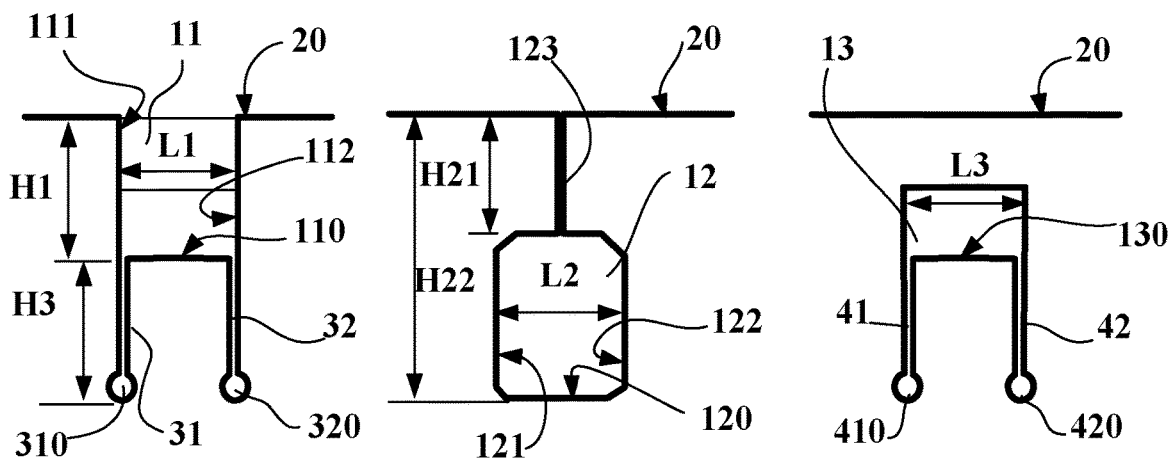
FIG. 2 shows a view in cross section of the tread shown in FIG. 1 on a section plane, the line of which is indicated by the line II-II.
FIG. 3 shows a view in cross section of the tread shown in FIG. 1 on a section plane, the line of which is indicated by the line III-III.
FIG. 4 shows a view in cross section of the tread shown in FIG. 1 on a section plane, the line of which is indicated by the line IV-IV.

FIG. 3 shows a cross section through the same wavy groove 1 made at an internal cavity 12. It is apparent that the internal cavity 12 extends from a depth H21 and down to a depth H22 (depth measured with respect to the tread surface 20 in the new state). This internal cavity 12 has a maximum width equal to L2 measured between the opposing walls 121, 122 delimiting this cavity, this width L2 being equal, in the present case, to the width L1 of the external cavities 11. Furthermore, each internal cavity 12 is continued by a sipe 123 that opens onto the tread surface 20 of the tread in the new state, this sipe 123 having an appropriate width for the opposing walls that delimit it to come into contact with one another when at least partially in the contact patch in contact with the road surface.

FIG. 4 shows a cross section through the same wavy groove 1 made at a linking cavity 13 in a section plane IV-IV indicated in FIG. 1. In this variant, each linking cavity 13 is provided with a bottom 130, this bottom being inclined and in the continuation, on one side, of the bottom 110 of an external cavity 11 and, on the other side, of the bottom 120 of an internal cavity 12. In the variant presented, the bottom 130 of the linking cavity 13 is provided with two sipes 41, 42 that are spaced apart by a width equal to the width L3 of the bottom 130 of the linking cavity 13. These sipes 41, 42 are ended, at their opposite ends from the bottom, by widened portions 410, 420 identical to the widened portions 310 and 320 of the sipes 31, 32 formed in the bottom of the external cavities 11. These sipes 41, 42, which start at the bottom of each linking cavity 13, are made in the continuation of the sipes 31, 32 formed in the bottom 110 of the external cavities 11.

Figure 5:
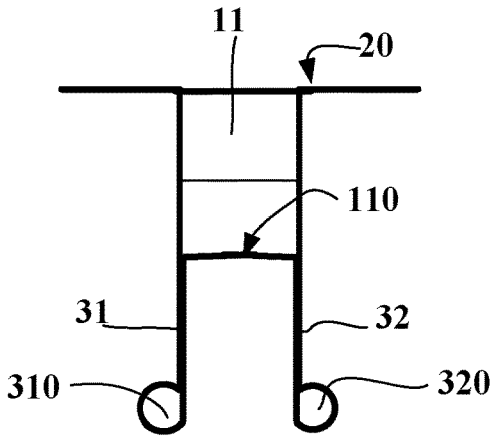
FIG. 5 shows a view in cross section of a variant of a wavy groove according to the invention.

FIG. 5 shows an embodiment variant of the invention, according to which the sipes 31, 32 formed in the bottom of the external cavities 11 are provided with a widened portion forming a channel 310, 320, respectively, the cross section of each channel 310, 320 being off-centre with respect to the sipe to which it is connected so as not to extend under the bottom 110 of the external cavity 11. This disposition is advantageous since it makes it possible to create flexibility on either side of the wavy groove 1 at the external cavities 11, and even also the linking cavities 13 as long as similar widened portions are made at the ends of the sipes 41, 42 formed in the bottom 130 of the linking cavities 13.

Figure 6:
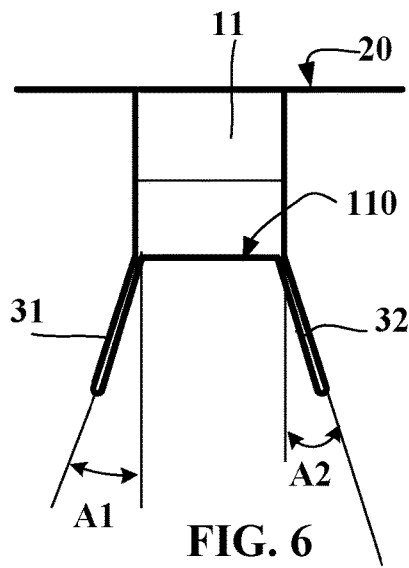
FIG. 6 shows another variant of the invention.

FIG. 6 shows another embodiment variant of the invention, according to which the sipes 31, 32 formed in the bottom 110 of the external cavities 11 are inclined with respect to a direction perpendicular to the tread surface 20 in the new state. In the variant presented, these sipes 31, 32 have respective inclinations A1, A2 such that each sipe does not extend in the material radially under the bottom 110 of the external cavity 11. The values of the angles A1 and A2 can be chosen in a range from 10 degrees to 30 degrees. As wearing progresses, the distance between the lines of the sipes 31, 32 in the tread surface increases. By virtue of this arrangement, it is possible to adapt the stiffnesses of the tread in the vicinity of the external cavities of a wavy groove.

Aspects of the invention also relate to a tire provided with a tread as described and even more particularly to a tread intended to be fitted to a heavy-duty vehicle.

Of course, the invention is not limited to the examples described and shown and various modifications can be made thereto without departing from the scope as defined by the claims. Notably, each variant described can be combined with at least one other of the variants described.

The invention claimed is:

1. A tread for a tire, comprising: a tread surface in the new state that is intended to come into contact with a road surface during running and, opening onto this tread surface, at least one circumferential continuous wavy groove that opens discontinuously onto the tread surface in the new state, each wavy groove having external cavities that open onto the tread surface in the new state along a length (Le) and internal cavities that do not open onto the tread surface in the new state, the external cavities comprising a bottom of which the points that are innermost in the tread are at a distance from the tread surface in the new state, the internal cavities having a bottom of which the innermost points are at a distance from the same tread surface, these external cavities and these internal cavities being connected together by linking cavities, radially extending sipes, each radially extending sipe extending from a respective internal cavity to the tread surface, the radially extending sipes having respective circumferential ends spaced apart from the external cavities, this tread having at least two circumferential sipes formed from the bottom of the external cavities and along the entire length (Le) of these external cavities at the axial edges of the external cavities, said sipes having depths, measured from the bottom of the external cavities, at least equal to 50% of the difference between the maximum depth of the bottom of the internal cavities and the depth of the external cavities.

2. The tire tread according to claim 1, wherein the sipes formed from the bottom of the external cavities and along the entire length (Le) of these external cavities have depths at least equal to 75% of the difference between the maximum depth of the bottom of the internal cavities and the depth of the external cavities.

3. The tire tread according to claim 1, wherein the sipes formed from the bottom of the external cavities comprise two sipes which are formed in the bottom of the external cavities, said sipes being spaced apart in the bottom of the external cavities by a distance equal to the maximum width of the external cavity.

4. The tire tread according to claim 1, wherein the sipes formed in the bottom of the external cavities have a depth at least equal to the difference between the maximum depth of the internal cavities and the depth of the external cavities.

5. The tire tread according to claim 1, wherein the sipes formed from the bottom of the external cavities are formed in the bottom of each external cavity and are inclined with respect to one another, the inclinations of the sipes formed from the bottom of the external cavities being such that the distance between the sipes increases with depth.

6. The tire tread according to claim 1, wherein each sipe formed from the bottom of the external cavities ends in an end cavity, the maximum width of this end cavity being greater than the mean width of the respective sipe.

7. The tire tread according to claim 6, wherein each end cavity that ends the respective sipe formed in the bottom of the external cavity is continued laterally with respect to the sipe on which it is formed in order to be positioned on only one side with respect to this same sipe.

8. The tire tread according to claim 7, wherein each end cavity that ends the respective sipe formed in the bottom of the external cavity is continued laterally with respect to the sipe on which it is formed in order not to be positioned radially under the bottom of the external cavity.

9. The tire tread according to claim 1, wherein linking sipes are formed in the bottom of the linking cavities between the external cavities and the internal cavities so that there is continuity between the bottom of these sipes and the bottom of the internal cavities.

10. The tire comprising a tread according to claim 1, wherein the tire is intended to be fitted to a heavy-duty vehicle.

* * * * *